United States Patent [19]

Jones

[11] Patent Number: 5,730,577
[45] Date of Patent: Mar. 24, 1998

[54] MOTORCYCLE LOADING AND UNLOADING DEVICE

[76] Inventor: Allan W. Jones, P.O. Box 16, Ravenna, Ky. 40472

[21] Appl. No.: 555,410

[22] Filed: Nov. 9, 1995

[51] Int. Cl.⁶ .................................................. B60F 1/43
[52] U.S. Cl. ........................ 414/462; 414/522; 414/538
[58] Field of Search ................................. 414/537, 538, 414/462, 430, 522

[56] References Cited

U.S. PATENT DOCUMENTS

| | | | |
|---|---|---|---|
| 2,305,762 | 12/1942 | Cristofeletti et al. | 414/538 |
| 2,387,082 | 10/1945 | Malling | 414/538 X |
| 2,414,447 | 1/1947 | Cargile | 414/537 X |
| 3,255,902 | 6/1966 | Welten | 414/537 |
| 3,366,256 | 1/1968 | Meredith et al. | 414/462 |
| 3,591,029 | 7/1971 | Coffey | 414/462 |
| 3,618,796 | 11/1971 | Peisner | 414/537 X |
| 3,687,314 | 8/1972 | Haugland | 414/537 X |
| 3,768,673 | 10/1973 | Nydam et al. | 414/537 X |
| 3,843,001 | 10/1974 | Willis | 414/462 |
| 4,906,041 | 3/1990 | McKenzie | 414/537 X |
| 4,932,829 | 6/1990 | Miller | 414/462 |
| 5,052,878 | 10/1991 | Brockhaus | 414/522 |
| 5,145,308 | 9/1992 | Vaughn et al. | 414/537 X |
| 5,244,335 | 9/1993 | Johns | 414/537 |
| 5,366,338 | 11/1994 | Mortensen | 414/563 |
| 5,393,192 | 2/1995 | Hall et al. | 414/537 |
| 5,535,929 | 7/1996 | Neill | 414/462 X |

*Primary Examiner*—David A. Bucci
*Attorney, Agent, or Firm*—Alfred J. Mangels

[57] ABSTRACT

A motorcycle loading and unloading device including a ramp having a pair of spaced, parallel ramp rails. The ramp is adapted to be connected with a pair of bed rails that are carried on the bed of a truck or on the bed of a trailer. A carriage member that includes a frame that supports a pair of wheels at each corner of the frame is provided to receive the front wheel of the motorcycle. One of the corner-mounted wheels is engageable with the ramp to serve as a ramp wheel and the other wheel is spaced laterally from the ramp wheel engageable with the bed rail and serves as a bed rail wheel. Positioned adjacent the bed rail wheels and the ramp rail wheels are laterally extending retainer members engageable with an underside of the respective ramp rail and the bed rail to prevent lateral tipping of the carriage as it moves along the ramp rails and the bed rails. The arrangement enables loading and unloading of a motorcycle to be effected by a single individual without danger of tipping of the motorcycle either during loading or unloading, or while the motorcycle is being transported by the truck or trailer.

26 Claims, 9 Drawing Sheets

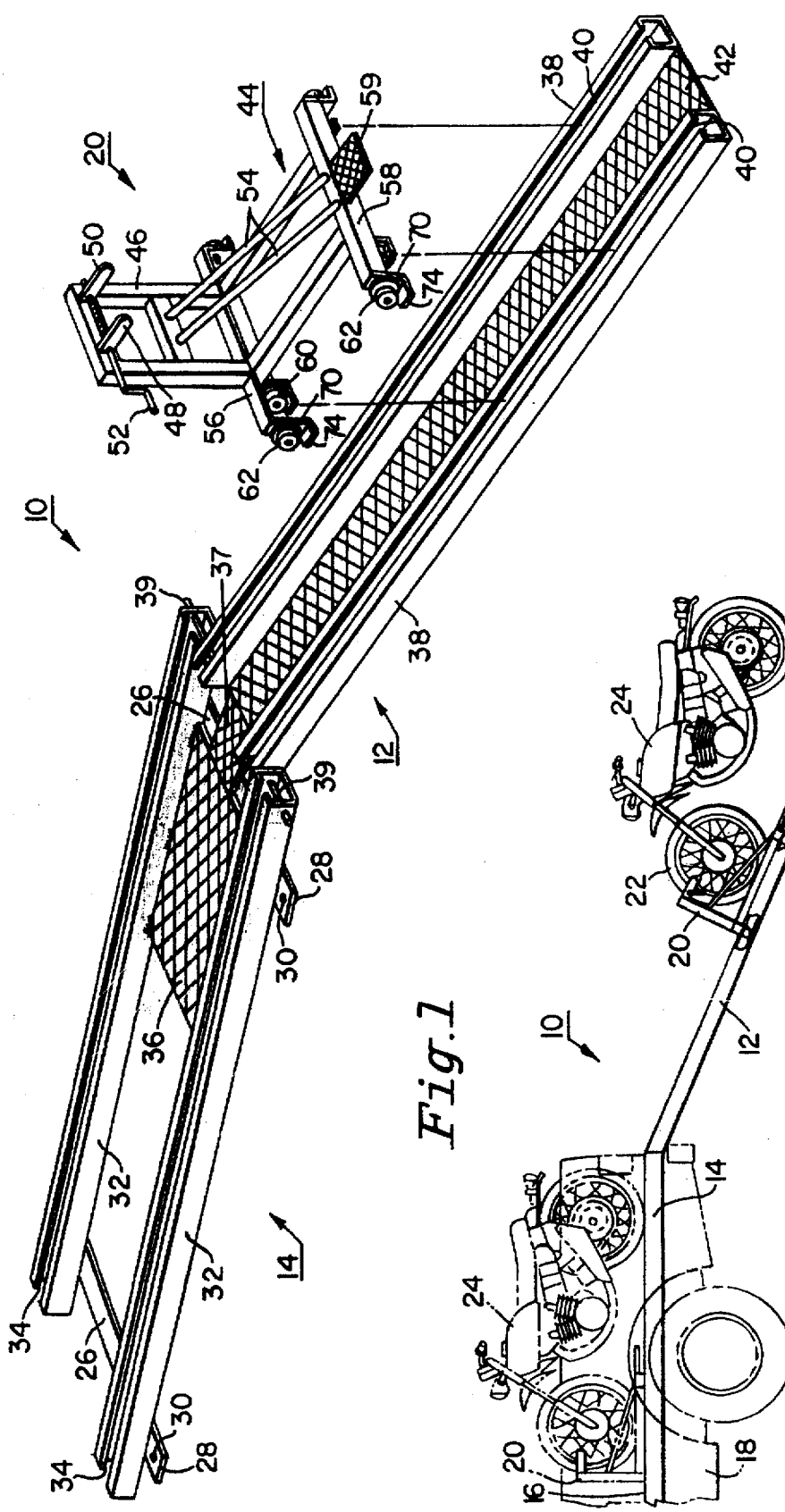

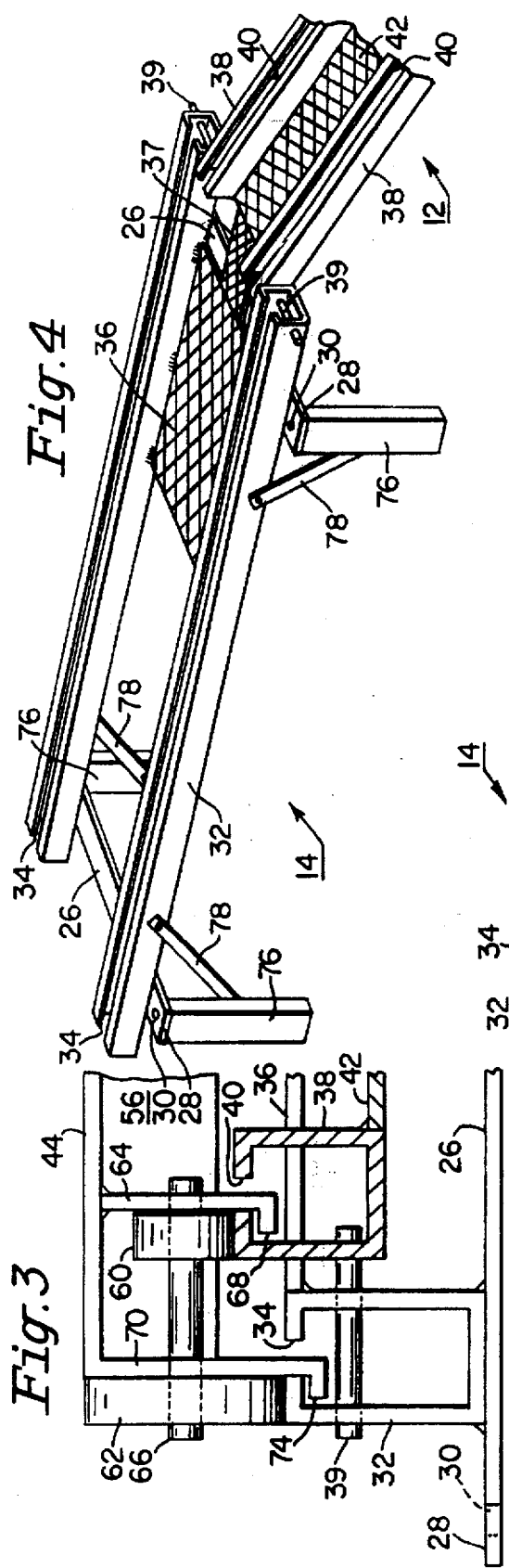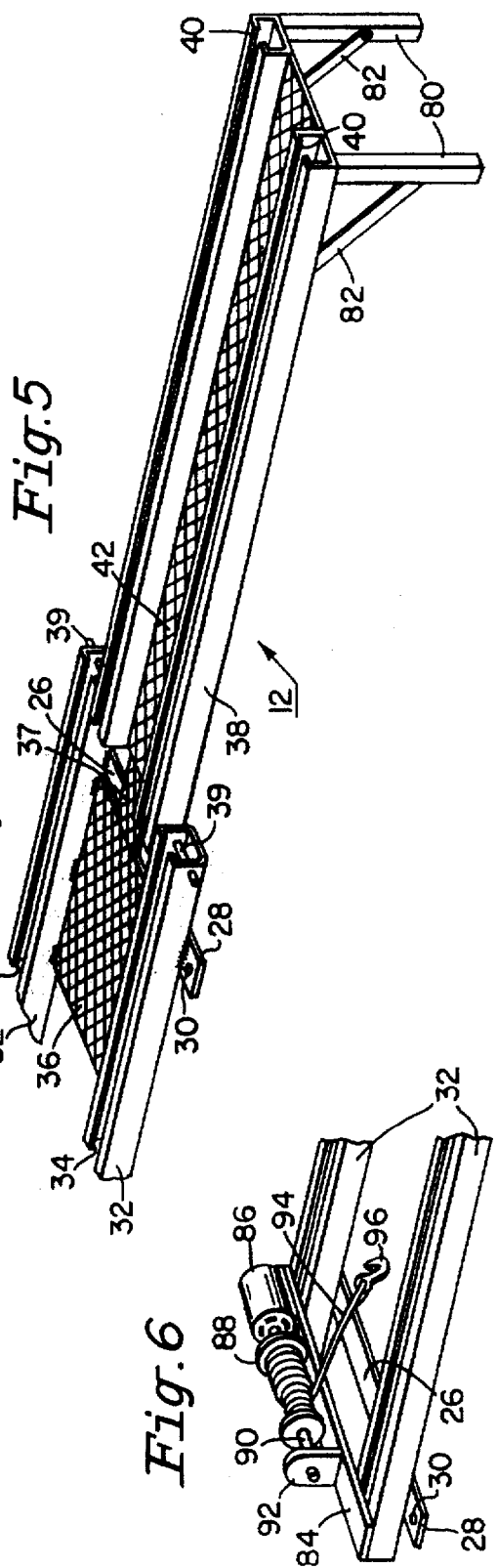

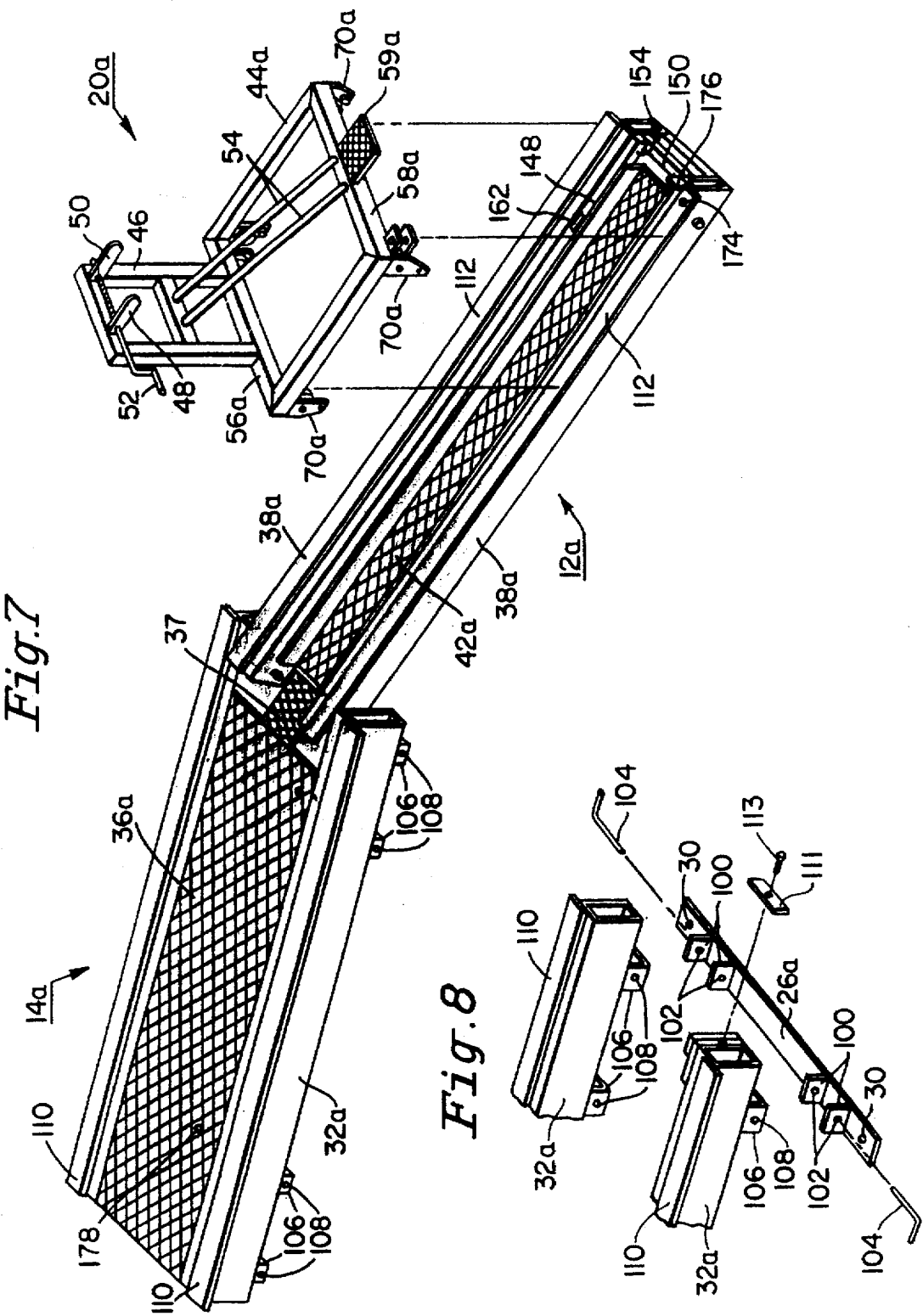

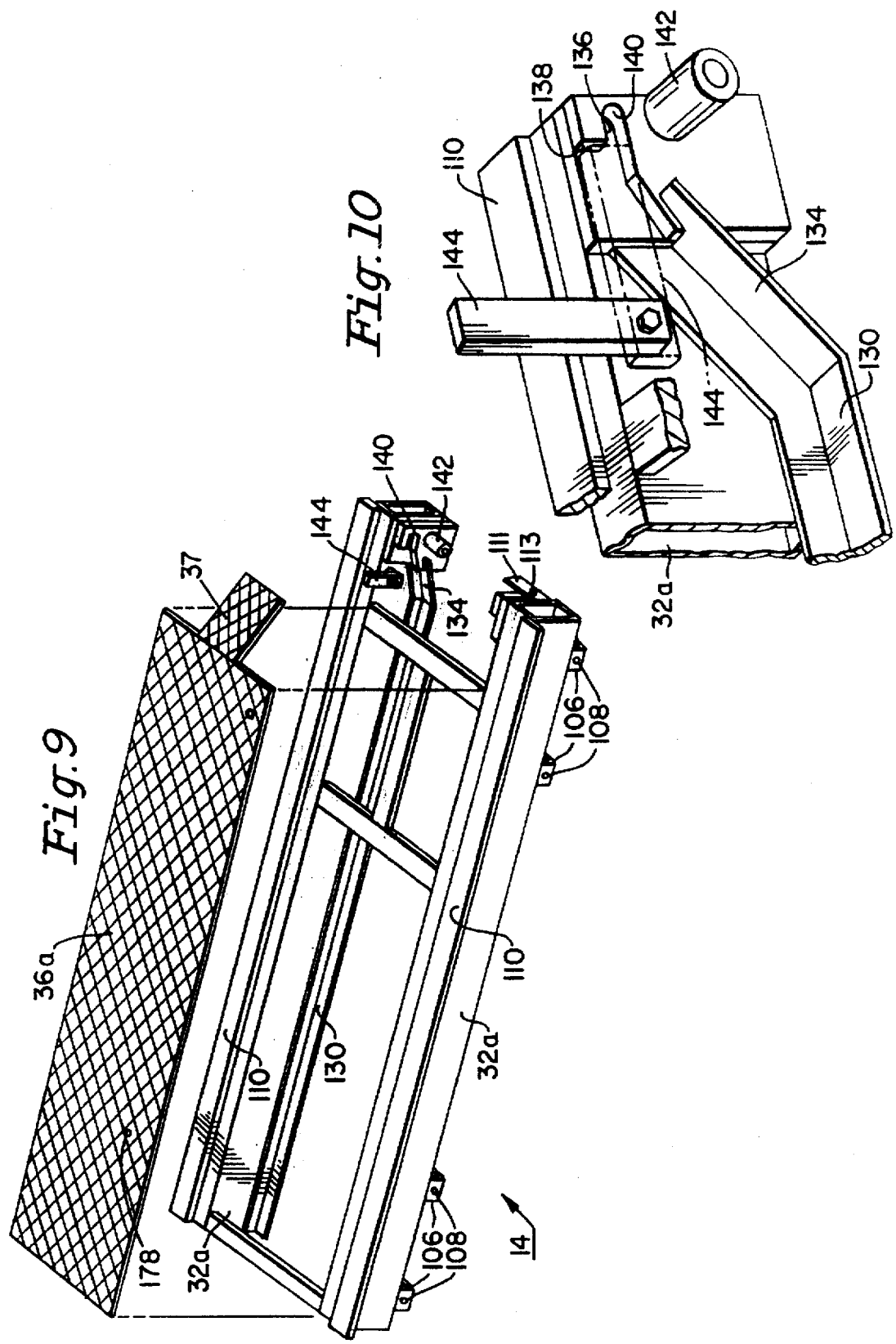

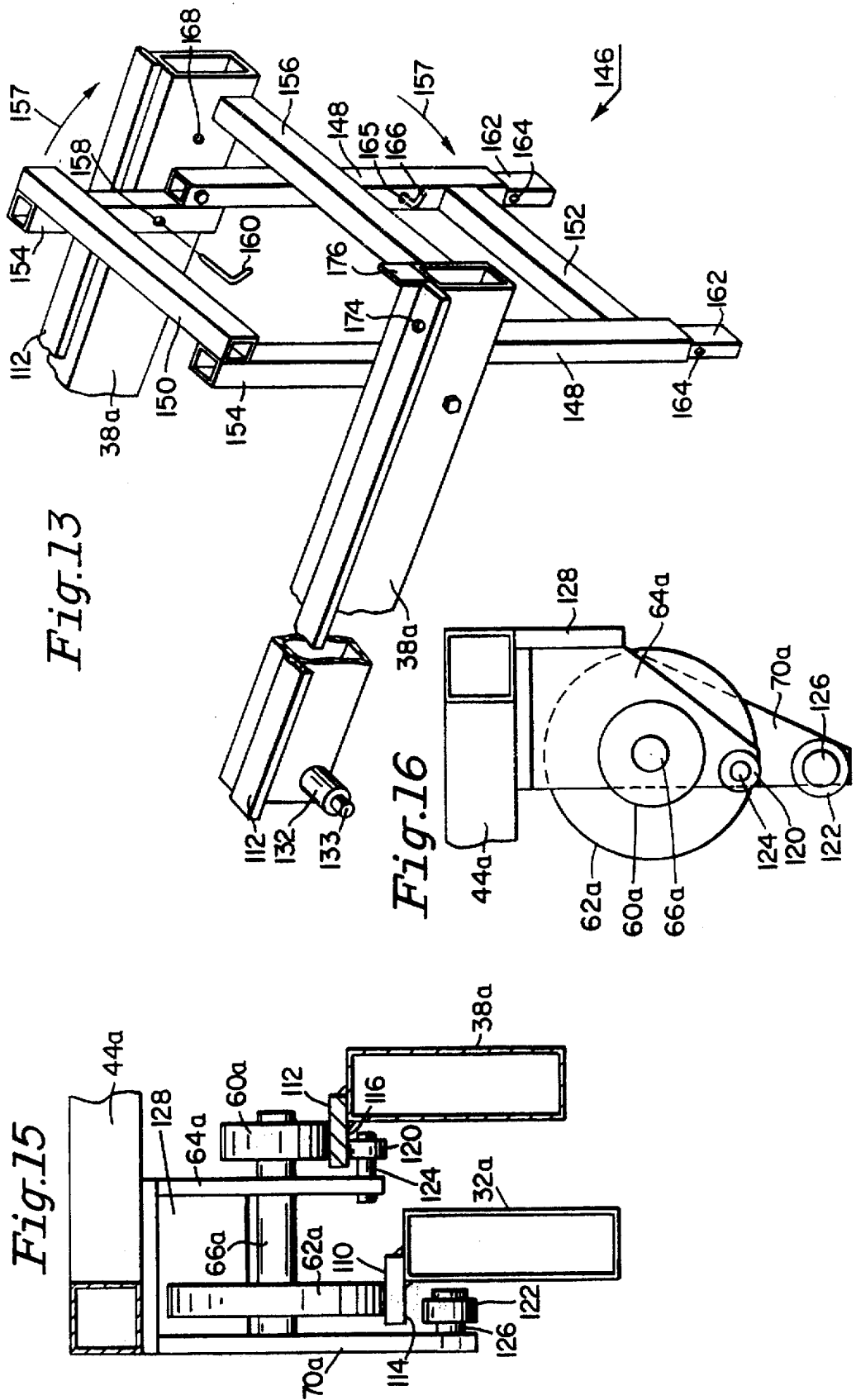

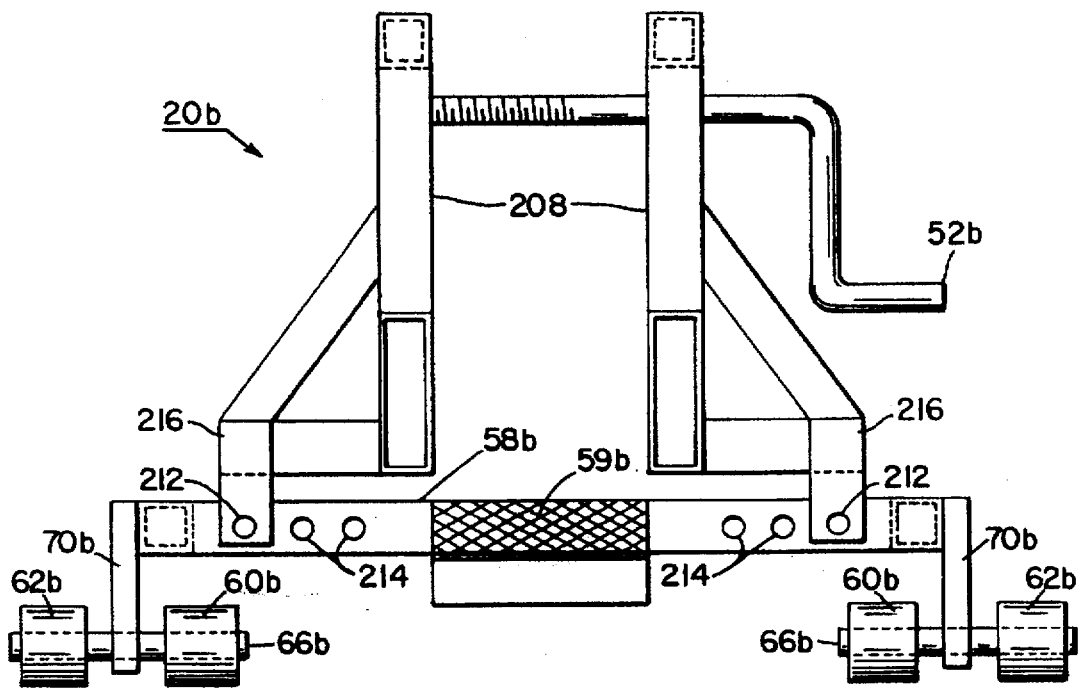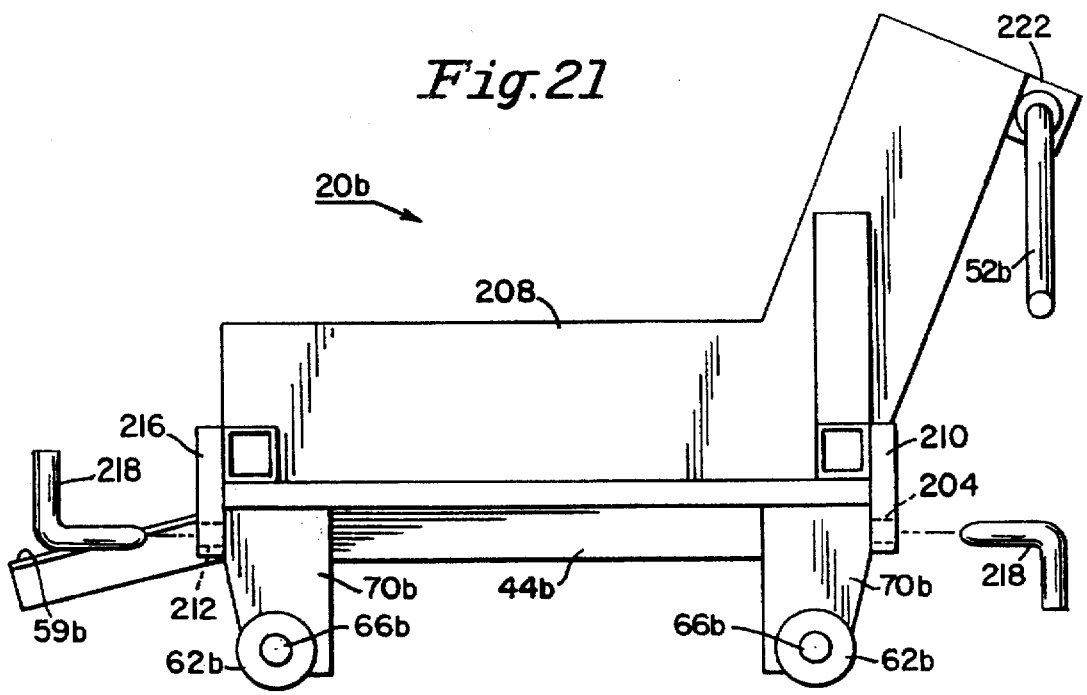

MOTORCYCLE LOADING AND UNLOADING DEVICE

BACKGROUND OF THE INVENTION

1. Field of the Invention

The present invention relates to a device for loading and unloading a motorcycle to and from the bed of a flat bed truck or to or from a trailer. More particularly, the present invention relates to a motorcycle loading and unloading device that includes an inclined ramp that permits rapid and convenient loading or unloading of a motorcycle to or from an elevated vehicle bed and ground level by a single person and without a risk of tipping over of the motorcycle relative to the ramp and bed during the loading and unloading operation.

2. Description of the Related Art

Motorcycles, especially racing motorcycles or trail motorcycles, are often transported to and from a place of use by loading them on the bed of a transporting vehicle. Such transporting operations often involve the transportation of special, non-standard or competitive motorcycles of a type not normally intended for street use, or to transport standard types of motorcycles, to or from repair facilities. Placement of motorcycles on the beds of trucks or trailers generally requires elevating the motorcycle from ground level to the level of the truck or trailer bed, which can generally be accomplished by some type of a ramp structure. However, because of the inherent lateral instability of motorcycles, as compared with three or four wheeled vehicles, often at least two people are required safely to push a heavy motorcycle up a ramp onto a truck or trailer bed to avoid lateral tipping of the motorcycle.

Various types of ramp structures have been disclosed to permit the convenient transfer of a vehicle from ground level to a truck or trailer bed. For example, in U.S. Pat. No. 3,687,314, which issued on Aug. 29, 1972, to Earl W. Haugland, there is disclosed a ramp arrangement for loading and unloading a snowmobile onto a pickup truck bed. The ramp is in the form of a rectangular frame that includes a pair of spaced, parallel channel members that include rollers within the channel members to slidably receive the skis of the snowmobile. A lifting chain is provided at the ground level end of the frame to permit an individual to lift that end of the frame to the level of the front portion of the frame adjacent the trailer bed, to thereby permit pushing of the snowmobile along the rollers and onto the trailer bed, along with the ramp and a smaller forward section carried on wheels.

Another arrangement for transferring a vehicle, such as a four wheeled vehicle, onto a truck trailer bed is disclosed in U.S. Pat. No. 3,768,673, which issued on Oct. 30, 1973, to Bernard Nydam et al. The disclosed structure includes a platform assembly including a flat bed carried by a rectangular frame that includes rollers adapted to engage with the tracks that are positioned on the truck bed. When used to transfer a vehicle from ground level to the elevated truck bed the platform assembly serves as a ramp, and when the vehicle being transferred is at the forwardmost end of the ramp the ramp can be lifted and rolled along the tracks by pushing the platform and vehicle combination in a forward direction relative to the truck bed.

A further form of loading arrangement, one intended for motorcycles, is disclosed in U.S. Pat. No. 4,932,829, which issued on Jun. 12, 1990, to Robert W. Miller. That arrangement includes an articulated carrier that includes a channel-shaped track having a pivotally connected, channel-shaped forward track segment and a pivotally connected, channel-shaped rear extension of the track. A pulley and cable arrangement are provided to lift the motorcycle and track member onto truck bed.

Although the devices hereinabove identified and described are suitable for the purposes disclosed in the patents identified, it is desirable to provide an improved motorcycle loading and unloading device that permits the loading and unloading of a motorcycle onto an elevated bed to be performed by a single individual, and without the danger of lateral tipping of the motorcycle, either while on the ramp or while on the bed.

It is therefore an object of the present invention to provide an improved motorcycle loading and unloading device to enable loading and unloading to be safely performed by a single person.

SUMMARY OF THE INVENTION

Briefly stated, in accordance with one aspect of the present invention, a device is provided for transferring a wheeled vehicle to a carrier vehicle for transporting the carried vehicle by the carrier vehicle. The device includes a ramp member adapted for placement in an inclined position relative to the carrier vehicle to enable movement of the carried vehicle from a first, lower level, to the bed of the carrier vehicle. The ramp member defines a pair of spaced, parallel ramp rails.

A pair of spaced, parallel bed rails supported by the bed surface of the carrier vehicle is provided and is engagable with an end of the ramp member to define a continuous pathway for moving the carried vehicle from a first, lower level to a second, upper level on the carrier vehicle.

A carriage member is provided for supporting the carried vehicle, the carriage member having a plurality of first rollers adapted to roll along the ramp rails, and a plurality of second rollers adapted to roll along the bed rails. The ramp members are slidable relative to the bed rails to enable the ramp member to be stored on the carrier vehicle adjacent the bed rails after the carried vehicle is in position on the carrier vehicle.

In accordance with another aspect of the present invention, the carriage member includes at least one pair of retainer members extending from the carriage member and engageable with the ramp rails or with the bed rails to prevent lateral tipping of the motorcycle by contact of the retainer members with one of the ramp rails and the bed rails.

BRIEF DESCRIPTION OF THE DRAWINGS

FIG. 1 is a side elevational view showing a portion of a pickup truck bed and a loading ramp in accordance with the present invention for permitting convenient loading of the motorcycle onto the truck bed.

FIG. 2 is an enlarged perspective view of the motorcycle transport ramp and the bed rail arrangement shown in FIG. 1, together with a carriage for receiving and supporting the front wheel of the motorcycle and having wheels to engage the ramp and the bed rails.

FIG. 3 is an enlarged, fragmentary, transverse sectional view through a part of the carriage frame showing the bed rails and ramp rails in interengaged condition, and also showing the carriage wheels in contact with the respective bed and ramp rails.

FIG. 4 is a fragmentary perspective view of the bed rails and ramp removed from the truck bed and placed upon support legs to provide a work station for supporting the motorcycle above ground level.

FIG. 5 is a fragmentary perspective view of the bed rails and ramp removed from the truck bed showing the ramp portion of the device with a folding leg and support arrangement for supporting the outermost end of the ramp in elevated condition, to provide an elevated work station for supporting the motorcycle above ground level.

FIG. 6 is a fragmentary perspective view showing a motor driven winch arrangement for pulling the motorcycle and carriage combination along the ramp and bed rails onto the truck bed.

FIG. 7 is a perspective view showing another embodiment of a ramp, bed rail, and carriage structure in accordance with the present invention.

FIG. 8 is a fragmentary perspective view showing one arrangement for removably connecting a pair of bed rails with a truck or trailer bed.

FIG. 9 is a fragmentary perspective view similar to FIG. 7, showing the bed rail structure with the associated bed plate shown raised from its normal position, to expose tracks carried at the lower side of the bed rail structure.

FIG. 10 is an enlarged, fragmentary perspective view of the rearmost portion of the bed rail structure shown in FIG. 7 and illustrating the ramp member retention arrangement.

FIG. 13 is a fragmentary perspective view showing the ramp structure shown in FIG. 7 together with a folding leg arrangement at the outermost end of the ramp structure.

FIG. 15 is an enlarged, fragmentary, transverse sectional view through a part of the carriage frame showing the bed rails and ramp rails in interengaged condition, and also showing the carriage wheels in contact with the respective bed and ramp rails for the carriage and rail structure included in the embodiment illustrated in FIG. 7.

FIG. 16 is a fragmentary side view showing the carriage wheel arrangement for the carriage structure shown in FIG. 15.

FIG. 20 is a rear view of the carriage structure for the embodiment of the invention shown in FIG. 17.

FIG. 21 is a side view of the carriage structure for the embodiment of the invention shown in FIG. 17.

DESCRIPTION OF THE PREFERRED EMBODIMENTS

Figure 11:
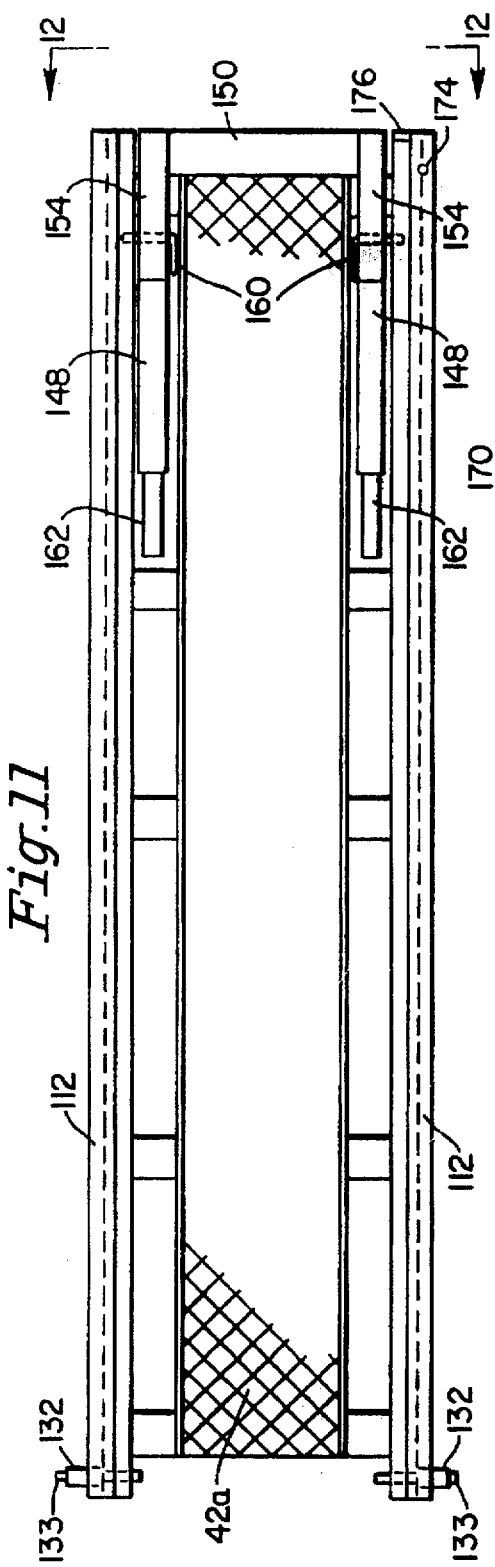
FIG. 11 is a top plan view of the ramp structure shown in FIG. 7.
Figure 14:
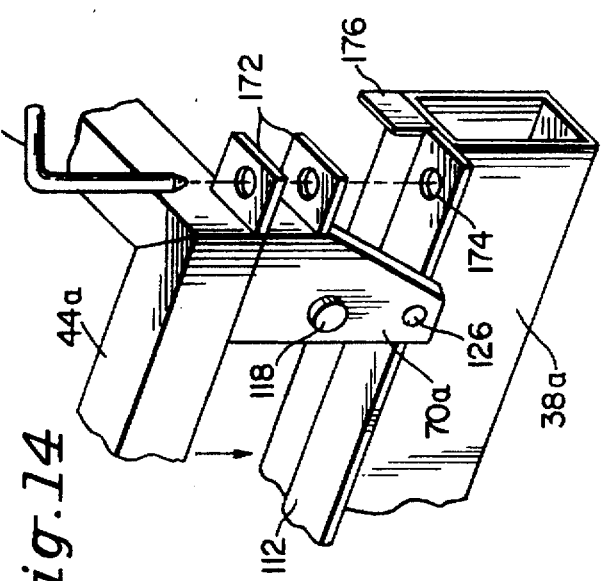
FIG. 14 is a fragmentary perspective view showing one form of retention arrangement for retaining the carriage member on the ramp rails when the carriage member is in position to receive a wheel of the motorcycle prior to loading.
Figure 12:
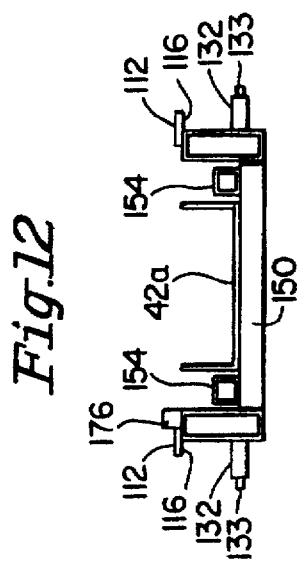
FIG. 12 is an end view of the ramp structure shown in FIG. 11, taken along line 12—12 thereof.

Referring now to the drawings, and particularly to FIGS. 1 and 2 thereof, there is shown a motorcycle loading and unloading device 10 including a ramp rail structure 12 and a bed rail structure 14 to facilitate the loading and unloading of a motorcycle from ground level to an elevated truck bed 16 of a pickup truck 18. As shown in FIG. 1 bed rail structure 14 is mounted on the elevated bed 16 of pickup truck 18. Although the invention is described herein in connection with its use on a pickup truck as the motorcycle carrying vehicle, it will be appreciated by those skilled in the art that the motorcycle carrying vehicle can, if desired, be a trailer, a van, a panel truck, or the like.

As shown in FIG. 1, ramp rail structure 12 extends rearwardly from bed rail structure 14 to define a ramp leading to and from the ground level to the level of truck bed 16. A carriage 20 is provided to receive the front wheel 22 of a motorcycle 24, and is movable along ramp rail structure 12 and along bed rail structure 14. Carriage 20 serves to assist in maintaining motorcycle 24 in an upright condition as it moves along ramp rail structure 12 and along bed rail structure 14, as will hereinafter be described.

Referring now to FIG. 2, bed rail structure 12 includes a pair of cross members 26 that include outwardly extending mounting tabs 28 having apertures 30 to permit bolting of cross members 26 to the truck bed (not shown). Cross members 26 are connected with a pair of spaced, parallel bed rails 32 that are each defined by a rectangular box beam structure, as seen in FIGS. 2 and 3. A longitudinal slot 34 extends along the uppermost face of the box beam structure defining bed rails 32. Extending between bed rails 32 at the rearmost end thereof, relative to truck bed 16, is a bed plate 36 to receive the rear wheel (not shown) of a motorcycle when it is in position on truck bed 16. A plate extension 37 extends rearwardly from bed plate 36 to provide a transition from the ramp to the bed.

Ramp rail structure 12 is defined by a pair of spaced, parallel ramp rails 38 that have a structure and cross section similar to that of bed rafts 32. The upwardly facing surfaces of ramp rails 38 each include a longitudinal slot 40, similar to slot 34 of bed rails 32. Extending between ramp rails 38 is a ramp plate 42 which, as shown, can have an embossed pattern to facilitate traction. Interconnection of ramp rail structure 12 and bed rail structure 14 is accomplished by a pair of coaxially positioned hinge pins 39.

Also shown in FIG. 2, in elevated condition relative to ramp rail structure 12, is a carriage member 20 for receiving a wheel of a motorcycle to be loaded onto the truck bed along ramp rail structure 12 and bed rail structure 14. Carriage member 20 includes a carriage base frame 44 of generally rectangular configuration. At the forward end of carriage base frame 44 is positioned a carriage upright frame 46 that supports a wheel damp that includes a fixed clamp member 48 and a movable damp member 50. A hand crank arrangement 52 is provided to shift movable clamp member 50 relative to fixed clamp member 48 for damping engagement therebetween of a motorcycle wheel.

A pair of spaced, parallel wheel guide bars 54 are provided on carriage 20 to extend from the rearmost portion of carriage base frame 44 to a position on carriage upright frame 46. The lateral spacing between the respective guide bars 54 is such as to permit accommodation of motorcycle wheels having a range of tire widths. Preferably, the length of guide bars 54 is such that when a motorcycle wheel is placed therebetween the wheel is supported by the front carriage cross member 56 and the rear carriage cross member 58 so that the lowermost surface of the motorcycle wheel is fully vertically supported on and carried by carriage base frame 44. A small ramp surface 59 is provided to facilitate movement of a motorcycle front wheel onto carriage 20. Although shown in FIG. 1 with the front wheel of the motorcycle received in carriage 20, it will be appreciated by those skilled in the art that the motorcycle rear wheel can instead be positioned in carriage 20 to enable the motorcycle to be loaded onto a truck bed.

As best seen in FIGS. 2 and 3, carriage 20 is provided with a pair of laterally spaced wheels at each corner of carriage base frame 44. Inner wheels 60 ride along the uppermost surface of ramp rails 38 and outer wheels 62 ride along the uppermost surface of bed rails 32. As shown in FIG. 3, in addition to being laterally offset relative to each other, inner wheels 60 are of a smaller diameter than outer wheels 62, in accordance with the relative vertical positions of the uppermost surfaces of ramp rails 38 and bed rails 32.

As also shown in FIG. 3, each wheel of carriage 20 has associated with it a retaining member configured to include a plate extending vertically downwardly from carriage base frame 44 and terminating in a laterally outwardly extending lip or tab that is adapted to extend within the rail structure and to underlie the respective rail surface. Thus, as shown, at each corner of carriage 20 is an inner wheel support 64 that carries a pivot axis 66 on which inner wheel 60 is rotatably carried. Inner wheel support 64 extends vertically downwardly from carriage frame 44 into the interior of the box beam structure that defines ramp rail 38 and terminates in an inner, laterally outwardly extending tab 68 that underlies the uppermost horizontal ramp rail surface and also underlies inner wheel 60. Similarly, outer wheel support 70 extends vertically downwardly from carriage frame 44 into the interior of the box beam structure that defines bed rail 32 and terminates in an outer, laterally outwardly extending tab 74 that underlies the uppermost horizontal bed rail surface and also underlies outer wheel 62. As will be apparent, the inner and outer lateral tabs 68 and 74 operate in conjunction with ramp rail 38 and bed rail 32, respectively, to prevent lateral tipping of the carriage member as it moves along the respective ramp rails and bed rails by limiting the amount of vertical movement of the respective wheels relative to the respective rails if the motorcycle tends to tip sideways as it is moved along the ramp rail structure 12 and the bed rail structure 14.

In addition to functioning as a transfer device to facilitate transfer of a motorcycle between ground level and an elevated bed, the structure in accordance with the present invention can also be arranged to provide an elevated work station to elevate the motorcycle above the ground for servicing or repair. As shown in FIG. 4, bed rails 32 and attached cross members 26 have been removed from the truck bed and respective legs 76 and support braces 78 have been provided at each corner of bed rail structure 14 to support bed rails 32 at a predetermined height above the ground, to facilitate servicing, repair, or cleaning of the motorcycle while in a more convenient position than being parked on the ground. FIG. 5 shows a similar leg 80 and brace 82 arrangement at the rearmost end of ramp rail structure 12, again for providing an elevated work station.

Loading the motorcycle onto the truck bed is accomplished by first securing a wheel of the motorcycle in carriage 20. Then the motorcycle and carriage can travel together as the motorcycle is moved up ramp rail structure 12 and along bed rail structure 14. Movement of the motorcycle and supporting carriage can be effected manually, by pushing the motorcyle upwardly along the ramp rails and then along the bed rails, or, alternatively, the motorcycle can be driven up the ramp and along the bed to the transporting position.

The loading operation can also be power assisted by use of the apparatus shown in FIG. 6. In that connection, a winch support plate 84 is connected across bed rails at 32 at the forwardmost position thereof, adjacent to the truck cab (not shown), or the forwardmost end of a trailer (not shown). An electrically powered winch drive motor 86 is secured to winch support plate 84, and a winch cable spool 88 is rotatably carried on drive motor shaft 90 between winch drive motor 86 and motor shaft support plate 92. A suitable cable 94 is provided and terminates in a winch cable hook 96 for engagement with the forwardmost end of carriage 20 to facilitate drawing the carriage and motorcycle upwardly along the ramp rails and along the bed rails.

An alternative embodiment for a motorcycle loading and unloading ramp structure in accordance with the present invention is shown in FIGS. 7 through 16. The alternative embodiment is similar in overall structure and operation to the embodiment shown in FIGS. 1 through 6, and parts having the same structure are identified in the drawings with the same reference numerals. However, parts present in both embodiments and similar in function but different in structure have the same numerical reference, but in the alternative embodiment shown in FIGS. 7 through 16 the reference numerals include the letter "a."

One difference between the two embodiments involves the provision as shown in FIG. 8 of a bed rail cross member 26a that is affixed to truck bed 16 (FIG. 1) and is arranged so that bed rails 32a are readily removable from the truck bed without the need to also remove the cross members. As best seen in FIG. 8, cross member 26a includes two pairs of upwardly extending connector flanges 100, each flange having an aperture 102 to slidably receive a bed rail retainer pin 104. Each of bed rails 32a includes at its lowermost surface a U-connector 106 that includes aligned apertures 108. U-connector 106 is adapted to fit between a pair of connector flanges 100 with apertures 102, 108 aligned so that U-connectors 106 are each received between a pair of connector flanges 100 and are retained in position with bed rail retainer pins 104 to secure bed rails 32a in position on the truck bed. Similarly, removal of bed rails 32a is enabled by removing retainer pins 104.

Another difference between the second embodiment shown in FIGS. 7 and 8 resides in the basic structure of bed rails 32a and ramp rails 38a. As best seen in FIG. 15, each of bed rails 32a and ramp rails 38a is defined by a closed box beam structure of generally rectangular cross section. Attached to the uppermost surface of the box beams are respective bed rail surfaces 110 and ramp rail surfaces 112, each of which is defined by an elongated bar that is securely connected with an associated bed rail 32a and an associated ramp rail 38a, respectively, as by welding, or the like. As shown, the respective bed rail surface 110 and ramp rail surface 112 are each laterally offset relative to the centerline of the box beams defining bed rail 32a and ramp rail 38a to provide respective engagement surfaces 114, 116 for retention of the carriage 20a, as will hereinafter be explained. One of bed rails 32a carries a rotatable ramp rail retainer 111 that can be rotated about bolt 113 to a first position to block rearward movement of the ramp rail assembly and retain it in interengaged position within and alongside bed rails 32a, and to a second position to permit the ramp rail assembly to slide rearwardly from between the bed rails.

Because of the different bed rail and ramp rail structure, the carriage wheel structural arrangement in the alternative embodiment of the invention is also correspondingly different. In that regard, the overall structure of carriage 20a is shown in FIG. 7, wherein the carriage includes a carriage base frame 44a of rectangular configuration, and a carriage upright frame 46, also of generally rectangular configuration, that extends upwardly from one end of carriage base frame 44a. A pair of motorcycle front wheel guide bars 54 extend from carriage upright frame 46 to carriage base frame 44a and are connected to the latter at the rear portion thereof. A motorcycle front wheel clamp arrangement similar to that in the embodiment shown in FIG. 2 is provided on carriage upright frame 46.

The carriage wheel structure in the alternative embodiment is best seen in FIG. 15, and includes an outer wheel support 70a and an inner wheel support 64a at each corner of base frame 44a. Wheel supports 64a and 70a are laterally spaced from each other and are substantially parallel with each other. An axle 66a is received between supports 64a and 70a and extends inwardly beyond inner support 64a to terminate in a ramp rail wheel 60a. A bed rail wheel 62a is positioned on axle 66a between outer wheel support 70a and inner wheel support 64a.

Carried at the lowermost ends of each of wheel supports 64a and 70a are respective retainer rollers 120, 122 that are rotatably carried on respective retainer roller axles 124, 126. As shown in FIG. 15, each of retainer rollers 120, 122 underlies a respective rail engagement surface 116, 114 and is spaced vertically therebelow a slight distance. A side view of the wheel structure is shown in FIG. 16. Retainer rollers 120, 122 of the alternative embodiment serve the same purpose as inner and outer lateral tabs 68, 74 in the embodiment illustrated in FIG. 3, to permit contact with a downwardly facing surface and thereby provide resistance to lateral tipping of carriage 20a relative to ramp rails 38a and bed rails 32a. A support plate 128 extends across carriage frame 44a at each of the front and rear ends thereof to provide additional support for inner and outer wheel supports 64a and 70a, respectively.

As shown in FIG. 7, bed rail structure 14a includes a bed plate 36a that extends along and between the respective bed rails 32a. Additionally, a narrower bed plate extension 37 extends rearwardly from the bed plate to contact ramp plate 42a.

Referring to FIGS. 9 and 10, bed rail structure 14a includes along the inwardly facing surfaces of each of bed rails 32a a track 130 along which ramp rail structure 12a is guided by ramp rollers 132 that are rotatably carried on pins 133 (see FIGS. 11, 12, and 13) when it is pushed forwardly between bed rails 32a to become nested within bed rail structure 14a. Tracks 130 extend linearly from the forwardmost end of bed rail structure 14a, adjacent the cab of the pickup truck or the front of the trailer with which the device is utilized, to a point inwardly of the rearmost end of bed rail structure 14a. An inclined ramp roller track 134 extends from the rearmost end of ramp roller track 130 to a ramp roller stop in the form of a slot 136 having a forwardly extending opening 138 to receive pivot pin 133 of a ramp roller 132.

Slot 136 terminates in a seat or stop 140 to limit rearward movement of ramp rail structure 12a relative to bed rail structure 14a. A rotatable bed roller 142 is carried adjacent the rearmost inner end of each of bed rails 32a, to rotatably carry and bear against engagement surface 116 on ramp rail 38a after ramp roller pivot pin 133 has been moved out of slot 136 and ramp roller 132 is in engagement with ramp roller track 130, to facilitate moving ramp rail structure 12a into nested relationship within bed rail structure 14a after the motorcycle has either been loaded or unloaded. A latch arm is provided and is pivotally carried by bed rail 32a, as shown in FIGS. 9 and 10, to retain ramp roller pivot pin 133 within slot 136 and against seat 140 when the ramp has been extended for use. The ramp roller pivot pin is retained in position when latch arm 144 is in the position shown by dashed lines in FIG. 10. Referring now to FIG. 13, ramp rail structure 12a includes a pivotable leg assembly 146 at the rearmost end thereof, to provide a support at the rear of the ramp rail structure to hold it in an elevated, substantially level condition to provide an elevated work station, similar to the arrangement shown in FIG. 5 for the first embodiment. Leg assembly 146 is shown in retracted condition in FIGS. 11 and 12, and in extended condition in FIG. 13, and includes a pair of spaced, parallel tubular sleeves 148, each of which is pivotally connected with a respective ramp rail 38a. Each of sleeves 148 can include an offset upper member 154, which is adapted to engage ramp rail cross member 156 and thereby limit pivotal movement of leg assembly 146 in the direction shown by arrows 157 in FIG. 13, to define its retracted position as shown in FIG. 11. An upper cross member 150 is connected with and extends between upper members 154, and a lower cross member 152 is connected with and extends between tubular sleeves 148. Upper member 154 includes a throughbore 158 for receiving a locking pin 160 that is received in an aperture (not shown) in ramp rail 38a for locking leg assembly 146 in the extended position shown in FIG. 13. Additionally, ramp rail 38a includes aperture 168 to receive locking pin 160 for locking leg assembly 146 in the retracted position shown in FIG. 11

Each of sleeves 148 telescopically receives a ramp leg 162, that includes a plurality of axially spaced, laterally extending throughbores 164, only one of which is visible in FIG. 13. A leg positioning pin 166 is removably received in one of throughbores 164 and passes through aperture 165 in sleeve 148 to enable ramp legs 162 to be extended to a desired length and retained in that position.

After the motorcycle has been loaded onto the truck bed, and after ramp rail assembly 12a is in nested relationship within bed rail assembly 14a, carriage 20a is in position with its wheels in engagement with bed rail surfaces 110. Similar to FIG. 14, carriage 20a is prevented from further movement along the bed rail surfaces and is retained in the forwardmost position on the bed rails by a carriage retainer pin 170 that extends through apertures formed in a pair of spaced retainer pin flanges 172 that extend rearwardly from frame 44a, and into a retainer pin aperture 178 in bed plate 36a. Additionally, a stop flange 176 is provided at the rear of one of ramp rails 38a to serve as a stop for the associated ramp rail wheel 62a to prevent carriage 20a separating from ramp assembly 12a.

The operation of the embodiment shown in FIGS. 7 through 16 is generally similar to that of the embodiment shown in FIGS. 1 through 6, and it provides an alternative form of structure for enabling convenient loading and unloading of a motorcycle from the ground level to an elevated bed in the form of a truck bed or trailer bed.

A third alternative embodiment for a motorcycle loading and unloading ramp structure in accordance with the present invention is shown in FIGS. 17 through 25. The third alternative embodiment is similar in overall structure and operation to the embodiments shown in FIGS. 1 through 16, and parts having the same structure are identified in the drawings with the same reference numerals. However, parts in the third embodiment that are similar in function but different in structure from corresponding parts of either of the first two embodiments hereinbefore described have the same reference numerals, but those reference numerals include the letter "b."

Figure 17:
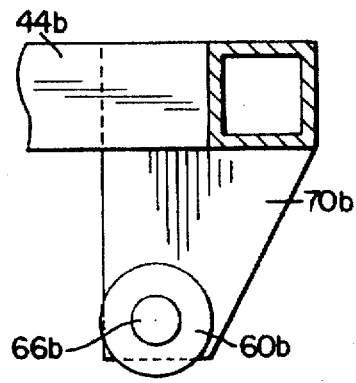
FIG. 17 is an enlarged, fragmentary, transverse sectional view similar to FIGS. 3 and 15 for a still further embodiment of a bed rail, ramp rail, and carriage structure in accordance with the present invention.
Figure 18:
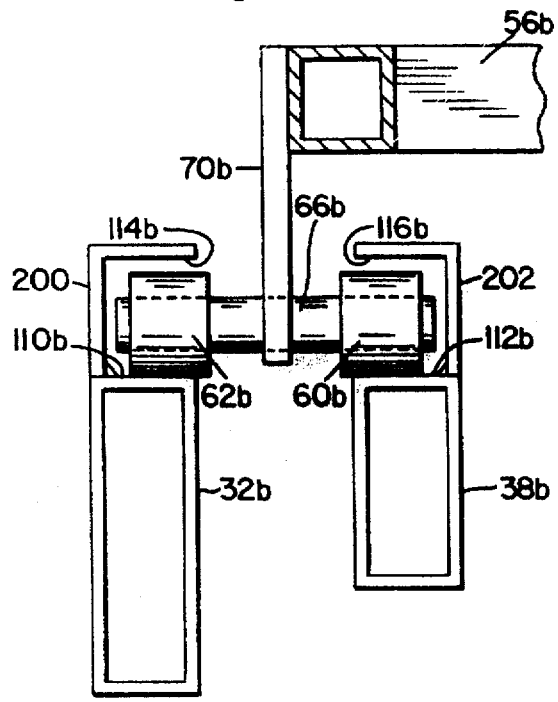
FIG. 18 is a fragmentary side view similar to FIG. 16, showing the carriage wheel support arrangement for the carriage structure shown in FIG. 17.

The carriage wheel and wheel retention arrangement in the third embodiment are shown in FIGS. 17 and 18. Wheel support 70b depends from carriage support frame 44b and rotatably supports an axle 66b that carries an inner wheel 60b and an outer wheel 62b. Each of wheels 60b and 62b are of the same diameter, but are spaced from wheel support 70b on respective opposite sides thereof. The wheels 60b and 62b are adapted to ride on respective ramp rail surfaces 112b and 110b, formed on the uppermost surfaces of ramp rail 38b and bed rail 32b, respectively. Additionally, bed rail 32b includes on the outer edge of its uppermost surface 110b an L-shaped wheel retainer 200 that includes engagement surface 114b that overlies and is spaced from rail surface 110b. Similarly, ramp rail 38b includes on the inner edge of its uppermost surface 112b an L-shaped wheel retainer 202 that includes engagement surface 116b that overlies and is spaced from rail surface 112b. Each of wheel retainers 200 and 202 serves to limit the amount of permissible vertical movement of the carriage wheels away from the rail surfaces and thereby prevents lateral tipping of the carriage as it moves along the respective rails.

Figure 19:
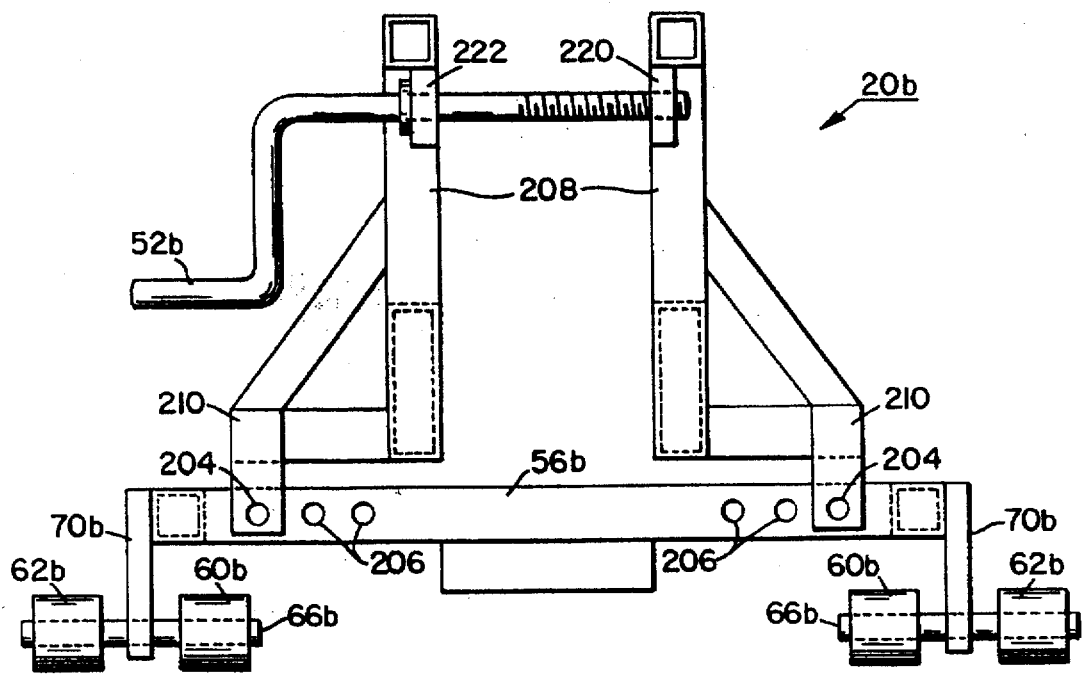
FIG. 19 is a front view of the carriage structure for the embodiment of the invention shown in FIG. 17.
Figure 22:
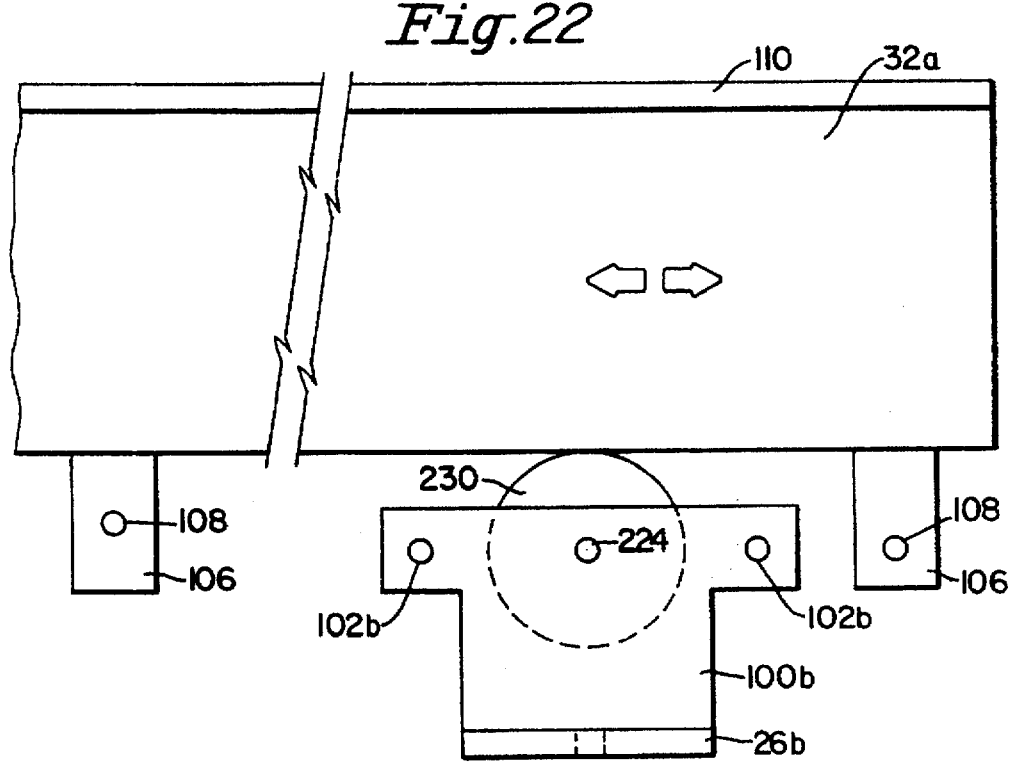
FIG. 22 is a fragmentary side view of an alternative bed and crossmember mounting arrangement.
Figure 23:
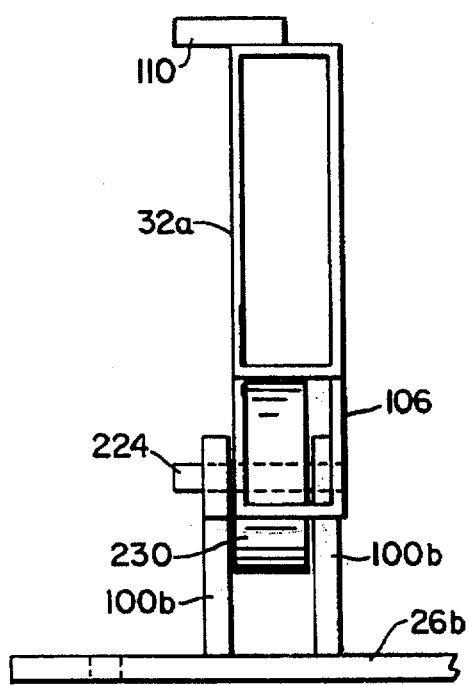
FIG. 23 is an end view of the bed an crossmember arrangement shown in FIG. 22.
Figure 24:
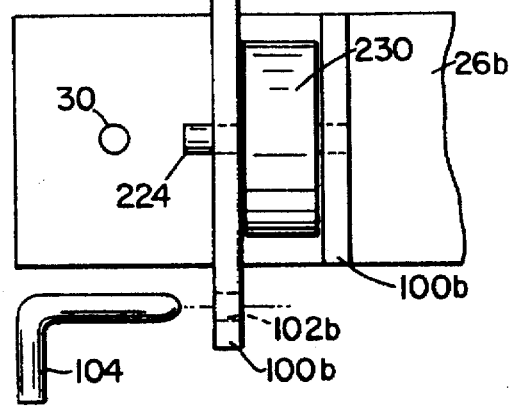
FIG. 24 is a fragmentary top view of the alternate crossmember arrangement shown in FIG. 22.
Figure 25:
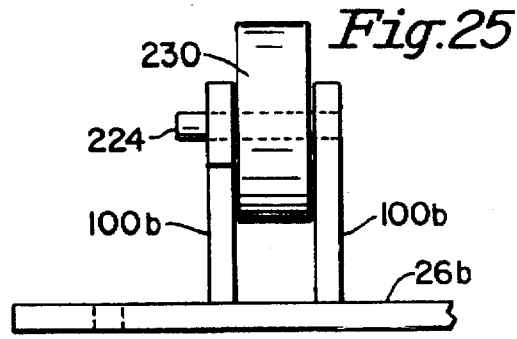
FIG. 25 is a front view of the alternate crossmember arrangement shown in FIG. 24.

Carriage member 20b for the third embodiment of the invention is shown in FIGS. 19 through 21. The structure shown provides greater versatility than the carriage structure illustrated in FIG. 2 by permitting wheel clamp members 208 to be shifted inwardly or outwardly and locked in position by retainer pins 218 received through apertures 204 in front adjustment bracket 210 and into throughbores 206 in front cross member 56b at the front of the carriage, and by similar retainer pins received through apertures 212 in rear adjustment bracket 216 and into throughbores 214 in rear cross member 58b at the rear of the carriage. As with the FIG. 2 embodiment, movement of clamp members 208 toward and away from each other is effected by hand crank 52b, which is rotatably received in bracket 222 and threadedly received in bracket 220.

An alternative arrangement for supporting the bed rails on the truck bed is shown in FIGS. 22 through 25. The alternative arrangement is similar to that shown in FIG. 8, except that the lowermost surface of bed rail 32a is in contact with roller 230 that is rotatably supported by roller axle 224. The advantage of the alternative arrangement is to permit the bed rail structure to be more easily moved rearwardly from the transport position by removing retaining pins 104, and without the need to remove the tailgate when the device is employed on a pick-up truck.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. Apparatus for transferring a two-wheeled vehicle having one wheel positioned behind the other to and from a carrier vehicle having an elevated bed surface for receiving and transporting the two-wheeled vehicle, said apparatus comprising:

a) a pair of spaced, parallel bed rails adapted to be connected with and supported by the bed surface of the carrier vehicle;

b) a ramp member for placement in an inclined position relative to the bed surface of the carrier vehicle and in substantial alignment with the bed rails to define a pathway from a first level below the bed surface to the bed surface, the ramp member including a pair of spaced, parallel ramp rails;

c) a carriage member including a wheel support for receiving and supporting a wheel of the two-wheeled vehicle, the carriage member having a plurality of wheels adapted for moving the carriage member along the ramp rails and along the bed rails; and d) retainer means adjacent to and spaced from the carriage member wheels for limiting lateral tilting of the carriage member and of the two-wheeled vehicle relative to the ramp member and relative to the bed rails while the carriage member is on the ramp rails and while it is on the bed rails.

2. Apparatus in accordance with claim 1, wherein the ramp member and the bed rails are pivotally connected with each other during loading and unloading of the wheeled vehicle to and from the carrier vehicle.

3. Apparatus in accordance with claim 1 wherein each ramp rail is defined by a cantilevered ramp rail member carried by the ramp member, and wherein the cantilevered ramp rail member includes an upwardly facing ramp rail surface and a downwardly facing surface that defines the retainer means for preventing tipping of the carriage member relative to the ramp member.

4. Apparatus in accordance with claim 3 wherein each bed rail is defined by a cantilevered bed rail member carried by a respective base member, and wherein the cantilevered bed rail member includes an upwardly facing bed rail surface and a downwardly facing bed rail anti-tipping surface.

5. Apparatus in accordance with claim 1 wherein the ramp rails are defined by a box beam structure including an upwardly-facing ramp rail surface and a downwardly-facing anti-tipping surface, a longitudinal ramp rail slot formed in the ramp rail surface, and wherein the carriage member includes a ramp rail retainer member extending from the carriage member and into the slot for engagement with the anti-tipping surface to limit lateral tipping of the carriage member as it is moved along the ramp member.

6. Apparatus in accordance with claim 5 wherein the bed rail is defined by a box beam structure including an upwardly-facing bed rail surface and a downwardly-facing anti-tipping surface, a longitudinal bed rail slot formed in the bed rail surface, and wherein the carriage member includes a bed rail retainer member extending from the carriage member and into the bed rail slot for engagement of the bed rail retainer member with the anti-tipping surface to limit lateral tipping of the carriage member as it is moved along the bed rails.

7. Apparatus in accordance with claim 1 wherein the ramp member includes a pair of ramp support legs pivotally carried at an end of the ramp member spaced from the bed rails for positioning the ramp rails in a substantially horizontal position and spaced from the first level.

8. Apparatus in accordance with claim 7 wherein the ramp support legs are carried by a leg support frame that is pivotally carried by the ramp member.

9. Apparatus in accordance with claim 8 wherein the ramp support legs are retractable relative to the leg support frame.

10. Apparatus in accordance with claim 1 wherein the bed member includes a bed plate between the bed rails for permitting rolling contact of a wheel of the two-wheeled vehicle as the wheeled vehicle is moved along the bed member.

11. Apparatus in accordance with claim 1 wherein the carriage member includes a slot for receiving a wheel of the carried two-wheeled vehicle and a wheel clamp for clamping the wheel of the two-wheeled vehicle to prevent relative movement of the clamped wheel relative to the carriage member.

12. Apparatus in accordance with claim 1 wherein the carriage member includes a pair of first rollers on each side of the carriage member for engagement with the ramp rails and a pair of second rollers on each side of the carriage member for engagement with the bed rails.

13. Apparatus in accordance with claim 12 wherein the first and second rollers are laterally offset from each other.

14. Apparatus in accordance with claim 12 wherein the pivot axes for the first and second rollers are coaxial.

15. Apparatus in accordance with claim 12 wherein the rollers that contact the ramp rails have a smaller diameter than the rollers that contact the bed rails.

16. Apparatus in accordance with claim 13 wherein the bed rail rollers are positioned laterally outwardly relative to the ramp rail rollers.

17. Apparatus in accordance with claim 1 wherein the retainer means are laterally-extending tab members.

18. Apparatus in accordance with claim 1 wherein the retainer means include retainer wheels that are rotatably carried on roller axes supported by the carriage member.

19. Apparatus in accordance with claim 1 wherein the retainer means are in underlying relationship with the ramp rails and with the bed rails.

20. Apparatus in accordance with claim 1 wherein the ramp member is narrower than the bed rails to permit the ramp member to be received between the bed rails after a two-wheeled vehicle has been loaded onto or unloaded from the carrier vehicle.

21. Apparatus in accordance with claim 19 wherein the retainer means are carried by the carriage member and include laterally-extending members that underlie and are spaced from peripheral surfaces of the carriage wheels.

22. Apparatus in accordance with claim 21 wherein the carriage member is a four-wheeled carrier.

23. Apparatus in accordance with claim 1 wherein the retaining means are spaced from peripheral surfaces of the carriage wheels.

24. Apparatus in accordance with claim 1 wherein the retaining means are carried by the bed rails and by the ramp rails.

25. Apparatus in accordance with claim 24 wherein the retaining means include laterally-extending members that overlie and are spaced from peripheral surfaces of the carriage member wheels.

26. Apparatus in accordance with claim 1 wherein the ramp member includes a panel member positioned between the ramp rails for providing a traction surface for the other wheel of the two-wheeled vehicle as the two-wheeled vehicle is loaded onto and unloaded from the carrier vehicle.

* * * * *

UNITED STATES PATENT AND TRADEMARK OFFICE
CERTIFICATE OF CORRECTION

PATENT NO. : 5,730,577
DATED : Mar. 24, 1998
INVENTOR(S) : Allan W. Jones

It is certified that error appears in the above-identified patent and that said Letters Patent is hereby corrected as shown below:

The title page, showing an illustrative figure, should be deleted and substitute therefor the attached title page.

United States Patent [19]

Jones

[11] Patent Number: 5,730,577
[45] Date of Patent: Mar. 24, 1998

[54] MOTORCYCLE LOADING AND UNLOADING DEVICE

[76] Inventor: Allan W. Jones, P.O. Box 16, Ravenna, Ky. 40472

[21] Appl. No.: 555,410

[22] Filed: Nov. 9, 1995

[51] Int. Cl.⁶ .................................................. B60F 1/43
[52] U.S. Cl. ........................... 414/462; 414/522; 414/538
[58] Field of Search ................................ 414/537, 538, 414/462, 430, 522

[56] References Cited

U.S. PATENT DOCUMENTS

| | | | |
|---|---|---|---|
| 2,305,762 | 12/1942 | Cristofeletti et al. | 414/538 |
| 2,387,082 | 10/1945 | Malling | 414/538 X |
| 2,414,447 | 1/1947 | Cargile | 414/537 X |
| 3,255,902 | 6/1966 | Welten | 414/537 |
| 3,366,256 | 1/1968 | Meredith et al. | 414/462 |
| 3,591,029 | 7/1971 | Coffey | 414/462 |
| 3,618,796 | 11/1971 | Peisner | 414/537 X |
| 3,687,314 | 8/1972 | Haugland | 414/537 X |
| 3,768,673 | 10/1973 | Nydam et al. | 414/537 X |
| 3,843,001 | 10/1974 | Willis | 414/462 |
| 4,906,041 | 3/1990 | McKenzie | 414/537 X |
| 4,932,829 | 6/1990 | Miller | 414/462 |
| 5,052,878 | 10/1991 | Brockhaus | 414/522 |
| 5,145,308 | 9/1992 | Vaughn et al. | 414/537 X |
| 5,244,335 | 9/1993 | Johns | 414/537 |
| 5,366,338 | 11/1994 | Mortensen | 414/563 |
| 5,393,192 | 2/1995 | Hall et al. | 414/537 |
| 5,535,929 | 7/1996 | Neill | 414/462 X |

Primary Examiner—David A. Bucci
Attorney, Agent, or Firm—Alfred J. Mangels

[57] ABSTRACT

A motorcycle loading and unloading device including a ramp having a pair of spaced, parallel ramp rails. The ramp is adapted to be connected with a pair of bed rails that are carried on the bed of a truck or on the bed of a trailer. A carriage member that includes a frame that supports a pair of wheels at each corner of the frame is provided to receive the front wheel of the motorcycle. One of the corner-mounted wheels is engageable with the ramp to serve as a ramp wheel and the other wheel is spaced laterally from the ramp wheel engageable with the bed rail and serves as a bed rail wheel. Positioned adjacent the bed rail wheels and the ramp rail wheels are laterally extending retainer members engageable with an underside of the respective ramp rail and the bed rail to prevent lateral tipping of the carriage as it moves along the ramp rails and the bed rails. The arrangement enables loading and unloading of a motorcycle to be effected by a single individual without danger of tipping of the motorcycle either during loading or unloading, or while the motorcycle is being transported by the truck or trailer.

26 Claims, 9 Drawing Sheets

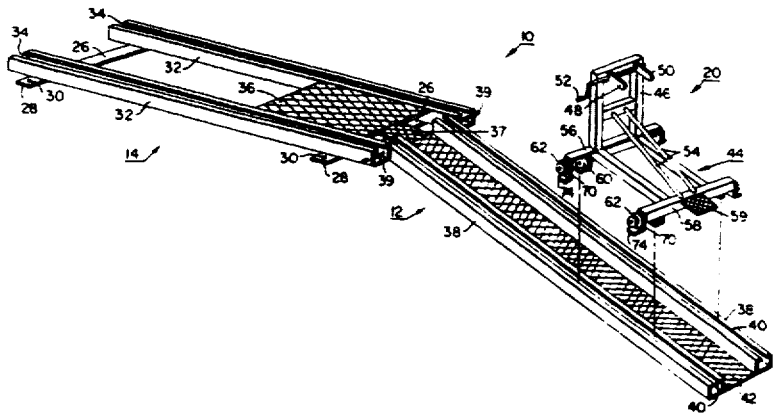

UNITED STATES PATENT AND TRADEMARK OFFICE
CERTIFICATE OF CORRECTION

PATENT NO. : 5,730,577                                    Page 3 of 4
DATED      : March 24, 1998
INVENTOR(S): Allan W. Jones It is certified that error appears in the above-indentified patent and that said Letters Patent is hereby corrected as shown below:

IN THE DRAWINGS, SHEET 1 SHOULD BE REPLACED WITH THE FOLLOWING:

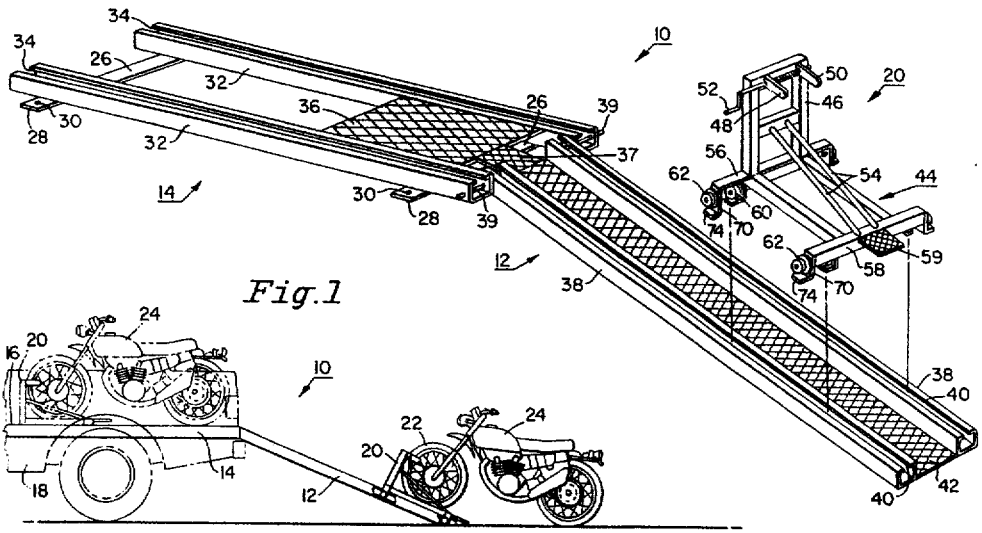

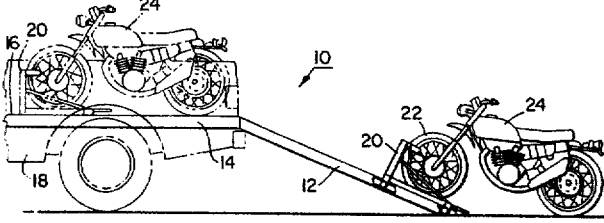

UNITED STATES PATENT AND TRADEMARK OFFICE
CERTIFICATE OF CORRECTION

PATENT NO. : 5,730,577
DATED : March 24, 1998
INVENTOR(S) : Allan W. Jones

Page 4 of 4

It is certified that error appears in the above-indentified patent and that said Letters Patent is hereby corrected as shown below:

IN THE DRAWINGS, SHEET 2 SHOULD BE REPLACED WITH THE FOLLOWING:

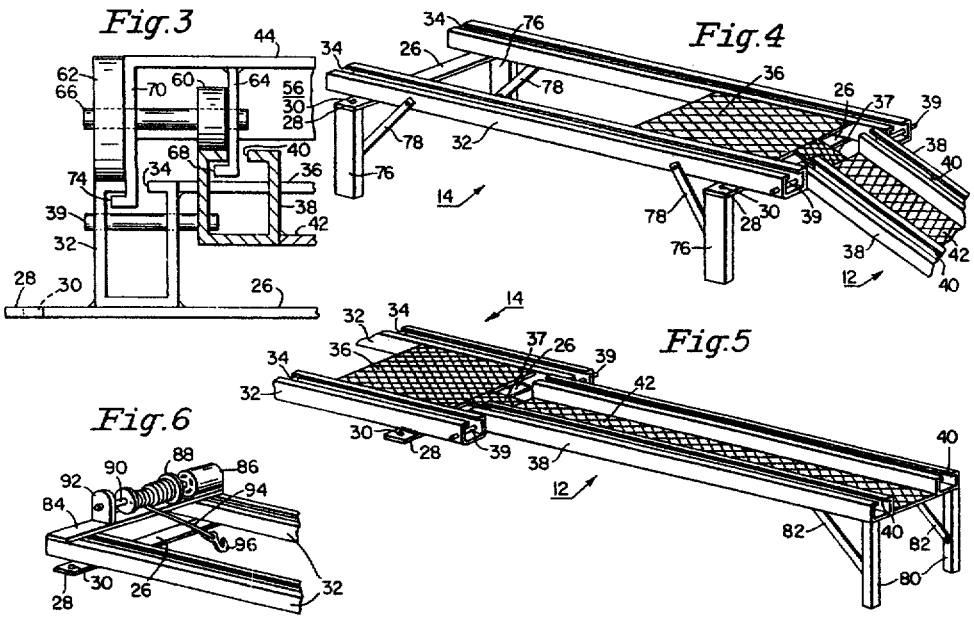

Signed and Sealed this

Thirtieth Day of June, 1998

*Attest:*

BRUCE LEHMAN

*Attesting Officer*    *Commissioner of Patents and Trademarks*